United States Patent [19]

Meczkowski et al.

[11] Patent Number: 4,696,824

[45] Date of Patent: Sep. 29, 1987

[54] BULK HANDLING OF RAISINS

[75] Inventors: Frank J. Meczkowski, Battle Creek; Ronald J. Triani, Kalamazoo, both of Mich.

[73] Assignee: General Foods Corporation, White Plains, N.Y.

[21] Appl. No.: 812,226

[22] Filed: Dec. 23, 1985

[51] Int. Cl.$^4$ .................................................. A23L 1/212
[52] U.S. Cl. .................................. 426/102; 426/303; 426/640
[58] Field of Search ............... 426/102, 103, 302, 303, 426/307, 310, 321, 324, 291, 646, 331

[56] References Cited

U.S. PATENT DOCUMENTS

| | | |
|---|---|---|
| 220,359 | 10/1879 | Dunham .............................. 426/307 |
| 1,711,728 | 5/1929 | Forestt ................................. 426/102 |
| 1,853,151 | 4/1932 | Segur .................................. 426/310 |
| 2,909,435 | 10/1959 | Watters et al. ...................... 426/291 |
| 3,516,836 | 6/1970 | Shea .................................... 426/102 |
| 4,103,035 | 7/1978 | Fulgar et al. ....................... 426/640 |
| 4,256,772 | 3/1981 | Shanbhgar .......................... 426/331 |
| 4,356,197 | 10/1982 | Devitt et al. ........................ 426/102 |
| 4,364,968 | 12/1982 | Waitman ............................. 426/640 |

*Primary Examiner*—Jeanette Hunter
*Attorney, Agent, or Firm*—Sam D. Walker; Thomas R. Savoie; Daniel J. Donovan

[57] ABSTRACT

Bulk handling, transportation and processing of raisins are improved by first coating raisins with glycerine followed by coating with oil. The finished raisins are packed in sizes of at least 1 lb and no clumping is observed.

7 Claims, No Drawings

BULK HANDLING OF RAISINS

FIELD OF THE INVENTION

The present invention is concerned with improved bulk handling, transportation and processing of raisins. More particular, the present invention is concerned with coating raisins with glycerine and oil to enhance bulk handling, transportation and processing.

BACKGROUND OF THE INVENTION

Bulk packing and handling of raisins have been accomplished by coating raisins with sucrose prior to packing. The presence of sucrose on the surface of the raisins prevents the raisins from sticking together forming large solid blocks. However, the presence of sucrose on the surface due to sugar melting which is subject to deleterious changes. Long storage and transportation generally result in mold growth on the surface of the raisins. To solve these problems, storage and transportation has been accomplished by shipping raisins in refrigerated container. This, however, significantly increases the cost of raisins.

Sucrose coated raisins have been critized for its unattractive appearance, while uncoated raisins have been critized for their hard texture presumably because of moisture losses and chemical changes. Attempts to overcome the above drawback were disclosed in U.S. Pat. No. 1,853,151 by Segur which teaches coating raisins with glycerol by spraying or by immersing in glycerol. The glycerol film was applied to keep the raisins soft and pliable. Fulger et al. in U.S. Pat. No. 4,103,035 also discloses treating raisins to improve softness retention. However, Fulger et al. first treats the raisins with organic or mineral acids, followed by the application of glycerol or glycerine.

The following references are of general interest.
(1) U.S. Pat. No. 3,726,693 by Harris discloses preventing hardening of dehydrated food by the application of a coating of vegetable oil, casinate, glycerial and gelatin.
(2) U.S. Pat. No. 1,434,837 by Newby discloses the treatment of dry figs to make them softer by subjecting the figs to a bath of water containing glycerine, salt, lemon juice and tartar.
(3) U.S. Pat. No. 3,368,909 by Moore et al. discloses a protective coating for raisins and other dried fruits made of amylose and or edible plasticizer such as glycerol.

None of the above references, however, disclose coating raisins or the treatment of raisins in a manner that would affect bulk handling, transportation and processing.

It is, therefore, an object of the present invention to improve the bulk handling of raisins.

Another object of the present invention is to improve the processing of raisins.

A further object of the present invention is to improve the bulk transportation of raisins.

SUMMARY OF THE INVENTION

The present invention is concerned with improving bulk handling, bulk transportation and processing of raisins wherein raisins are contacted with glycerine in amounts sufficient to completely coat the raisins, then contacting the coated raisins with oil in amounts sufficient to completely enrobe the coated raisins. The enrobed raisins were then packed in sizes of at least one pound.

DETAILED DESCRIPTION

In the present invention bulk handling, transportation and processing of raisins are improved by a series of coating steps. The first step is to contact the raisin with glycerine. This is accomplished by, first, heating the glycerine to a temperature of from 100° F. to 115° F. and preferably about 105° F. The heated glycerine is then topically coated on to raisins which were pretreated by contacting with warm water to raise their temperature to about 70° F. to 80° F. and preferably about 75° F.

It is preferred, however, that the glycerine be applied to the raisins while mixing in order to insure a uniform distribution of glycerine throughout the surface of the raisin. Sufficient time should be allowed to ensure that the glycerine is absorbed by the raisins. Mixing may be accomplished by any conventional tumbling means which would not destroy the structural integrity of the raisins.

The glycerine coated onto the raisins acts as a raisin conditioner and plasticizer, in that it prevents moisture and sugar from migrating to the surface of the raisins thereby contributing to the maintenance of the soft, fresh and moist texture of the raisin. In order to further maintain a soft, fresh and moist texture, the moisture of the raisins prior to the glycerine application should generally range from 10 to 24% and preferably from about 15 to 18% by weight of the raisin.

The glycerine coated raisin is further contacted with oil by topically applying same. The oil is applied while mixing to insure uniform distribution of the oil throughout the surface of the raisin. The amount of oil contacted with the coated raisin should generally range from 0.5 to 1.0% by weight of the raisins and preferably about 0.75%. The oil applied to the coated raisins should have a temperature ranging from 100° F. to 115° F. and preferably about 105° F.

The oil may be any oil or fat having a melting point greater than 75° F. Such oils include coconut oil, palm kernel oil, partially hydrogenated coconut oil, soybean oil, partially hydrogenated soy bean oil, corn oil, partially hydrogenated corn oil, sesame seed oil, partially hydrogenated sesame seed oil, safflower oil, partially hydrogenated safflower oil, cottonseed oil and combinations thereof.

The oil totally enrobes the glycerine coated raisins preventing migration of moisture and sugar thereby preventing clumping during transportation.

Prior to arriving at the unique processing step disclosed in the present invention, several attempts were made to eliminate the problems associated with bulk packing, bulk transportation and processing of raisins. For instance, raisins were coated with oil only and transported in bulk. Though the oil coating helped in minimizing stickiness on the surface of the raisins, it did not, however, eliminate major clumping. There was difficultly in removing the raisins from their containers due to clumping. Also refrigeration was required. When the raisins were coated with glycerine only and transported in bulk, clumping was more severe when compared to oil coating. The raisins were extremely sticky due to the migration of sugar and moisture to the surface, resulting in large clumps. Glycerine coating also requires refrigeration. Further, when oil is applied prior to glycerine, severe clumping also occur. The important feature of the present invention is the application of glycerine followed by the application of oil to raisins to improve bulk transportation, storage and processing without the need to transport and store under refrigerated conditions as is required by conventional means.

The following example is given to further illustrate the present invention, but is not intended to limit the invention disclosed herein.

EXAMPLE 1

To a bin containing 1,100 lbs. of raisins water having a temperature of 75° F. was added. Surface water was then removed using a shaker screen and ambient air. The raisins had a temperature of about 70° F. and a moisture of 16%. The raisins were then conveyed to a mixer where 10.41 lbs of glycerine having a temperature of 105° F. was added by spraying while mixing. The coated raisins were then allowed to temper for about 10 minutes to allow the glycerine to soak in.

The tempered raisins were then coated by spraying with 10.46 lbs of coconut oil (melting point 76° F.) having a temperature of 105° F. while mixing. After the oil was uniformly coated on the raisins, the raisins were placed in 1100 bin and stored at an ambient temperature.

The resulting raisins were transported and stored at ambient temperature. Upon evaluation they were easily removed from the container and free-flowing.

What is claimed is:

1. A process for improving bulk handling, transportation and processing or raisins consisting of:
   (a) coating raisins with glycerine in amounts ranging from 0.5 to 1.0% by weight of the raisins;
   (b) coating the glycerine coated raisins with oil in amounts ranging from 0.5 to 1.0% by weight of the coated raisins; and
   (c) packing the coated raisins in sizes of at least 1 lb. for bulk transportation without refrigeration.
2. A process according to claim 1 wherein the amount of glycerine is 0.75%.
3. A process according to claim 1 wherein the oil is selected from the group consisting of coconut oil, partially hydrogenated coconut oil, soy bean oil, palm kernel oil, partially hydrogenated soy bean oil, corn oil, partially hydrogenated corn oil, sesame seed oil, partially hydrogenated sesame seed oil, safflower oil, partially hydrogenated safflower oil, cottonseed oil and combination thereof.
4. A process according to claim 4 wherein the oil is coconut oil.
5. A process according to claim 1 wherein the amount of oil is 0.75%.
6. A process according to claim 1 wherein the coated raisins are packed in sizes ranging from 1 lb to 1,100 lbs.
7. A raisin prepared according to the process of claim 1.

* * * * *